(12) United States Patent
Parusel et al.

(10) Patent No.: US 11,420,333 B2
(45) Date of Patent: Aug. 23, 2022

(54) ROBOT AND METHOD FOR CONTROLLING A ROBOT

(71) Applicant: Franka Emika GmbH, Munich (DE)

(72) Inventors: Sven Parusel, Munich (DE); Simon Haddadin, Munich (DE); Niklas Böhme, Munich (DE); Tim Rokahr, Munich (DE)

(73) Assignee: Franka Emika GmbH, Munich (DE)

( * ) Notice: Subject to any disclaimer, the term of this patent is extended or adjusted under 35 U.S.C. 154(b) by 261 days.

(21) Appl. No.: 16/607,284

(22) PCT Filed: Apr. 18, 2018

(86) PCT No.: PCT/EP2018/059883
§ 371 (c)(1),
(2) Date: Oct. 22, 2019

(87) PCT Pub. No.: WO2018/197295
PCT Pub. Date: Nov. 1, 2018

(65) Prior Publication Data
US 2020/0384651 A1  Dec. 10, 2020

(30) Foreign Application Priority Data
Apr. 23, 2017  (DE) ............... 10 2017 003 899.6

(51) Int. Cl.
*B25J 9/16* (2006.01)
*B25J 13/00* (2006.01)
(Continued)

(52) U.S. Cl.
CPC .......... *B25J 9/1694* (2013.01); *B25J 9/1633* (2013.01); *B25J 9/1674* (2013.01); *B25J 9/1679* (2013.01);
(Continued)

(58) Field of Classification Search
CPC .............. B25J 9/16; B25J 13/00; B25J 13/06
See application file for complete search history.

(56) References Cited

U.S. PATENT DOCUMENTS

| 2004/0010344 A1 | 1/2004 | Hiratsuka et al. |
| 2004/0083010 A1 | 4/2004 | Nagata et al. |

(Continued)

FOREIGN PATENT DOCUMENTS

| CN | 104827473 A | 8/2015 |
| DE | 202005004456 U1 | 8/2005 |

(Continued)

OTHER PUBLICATIONS

De Luca, Alessandro, et al., "Collision Detection and Safe Reaction with the DLR-III Lightweight Manipulator Arm", International Conference on Intelligent Robots and Systems, Oct. 9-15, 2006, Beijing, China, pp. 1623-1630.

(Continued)

*Primary Examiner* — Kira Nguyen
(74) *Attorney, Agent, or Firm* — Hoffmann & Baron, LLP

(57) ABSTRACT

A robot having a robot manipulator with an effector, wherein the robot manipulator is designed and constructed for picking up, handling, and releasing an object and is controlled by a control unit, the robot including a first sensor means designed and constructed to determine a persisting adherence of the object to an effector after a release of the object by the effector, and where such an adherence persists, to generate a signal S, wherein when a signal S is present, the control unit is designed and constructed to control the robot manipulator in such a manner that it executes a predefined movement B in which the effector with the persistently adhering object is passed by a wiping object in such a manner that the adhering object is wiped off the effector on a surface or an edge of the wiping object.

14 Claims, 1 Drawing Sheet

(51) Int. Cl.
    *B25J 13/06* (2006.01)
    *B25J 13/08* (2006.01)
    *G06F 3/0486* (2013.01)
    *B25J 15/00* (2006.01)

(52) U.S. Cl.
    CPC ............ *B25J 13/006* (2013.01); *B25J 13/06* (2013.01); *B25J 13/084* (2013.01); *B25J 13/085* (2013.01); *G06F 3/0486* (2013.01); *B25J 15/00* (2013.01)

(56) References Cited

U.S. PATENT DOCUMENTS

| | | | |
|---|---|---|---|
| 2012/0000125 | A1 | 1/2012 | Rubatino et al. |
| 2013/0184860 | A1* | 7/2013 | Ota .................. B25J 9/1669 700/245 |
| 2013/0200644 | A1* | 8/2013 | Shiomi ............. B25J 9/1612 294/207 |
| 2015/0044948 | A1 | 2/2015 | Kottbus et al. |
| 2015/0217445 | A1 | 8/2015 | Hietmann et al. |
| 2016/0025757 | A1 | 1/2016 | Pollack et al. |
| 2016/0250757 | A1 | 9/2016 | Staab et al. |
| 2017/0014997 | A1 | 1/2017 | Rohmer et al. |
| 2018/0126567 | A1* | 5/2018 | Morimura .......... B23Q 11/1076 |

FOREIGN PATENT DOCUMENTS

| | | |
|---|---|---|
| DE | 102005017084 A1 | 10/2006 |
| DE | 102011007958 B4 | 3/2013 |
| DE | 102012006502 A1 | 10/2013 |
| DE | 102013003768 B4 | 4/2015 |
| EP | 2708335 A1 | 3/2014 |
| JP | 05-021233 A | 1/1993 |
| JP | 05-042491 A | 2/1993 |
| JP | H 07-024665 A | 1/1995 |
| JP | H 08-153960 A | 6/1996 |
| JP | 11-087422 A | 3/1999 |
| JP | 200124399 A | 1/2001 |
| JP | 2001-156498 A | 6/2001 |
| JP | 2002-287816 A | 10/2002 |
| JP | 2004-31429 A | 1/2004 |
| JP | 2004-42230 A | 2/2004 |
| JP | 2005-268313 A | 9/2005 |
| JP | 2006-60096 A | 3/2006 |
| JP | 2011-235423 A | 11/2011 |
| JP | 2013-030641 A | 2/2013 |
| JP | 2013-166234 A | 8/2013 |
| JP | 2014-144522 A | 8/2014 |
| WO | WO 2016189684 A1 | 3/2018 |

OTHER PUBLICATIONS

Cho, Chang-Nho, et al., "Collision detection and reaction on 7 DOF service robot arm using residual observer", Journal of Mechanical Science and Technology, Korean Society of Mechanical Engineers, Heidelberg, vol. 26, No. 4, Apr. 11, 2012, pp. 1197-1203.
English language summary of Office Action issued in Japanese Patent Application No. 2019-557591 dated Jan. 5, 2021.
English language summary of Office Action issued in Korean Patent Application No. 10-2019-7034575 dated May 18, 2021.
English Translation of the International Premliminary Report on Patentability issued in International Application No. PCT/EP2018/059883 dated Nov. 7, 2019.

* cited by examiner

ROBOT AND METHOD FOR CONTROLLING A ROBOT

CROSS-REFERENCE TO RELATED APPLICATIONS

The present application is the U.S. National Phase of PCT/EP2018/059883 filed on 18 Apr. 2018, which claims priority to German Patent Application No. 10 2017 003 899.6, filed on 23 Apr. 2017, the entire contents of which are incorporated herein by reference.

BACKGROUND

Field

The invention relates to a robot with at least one robot manipulator, which has an effector.

Related Art

Robots with robot manipulators are sufficiently known in the prior art. Such robot manipulators are typically controlled and/or regulated by a control unit on the basis of a control program. When handling objects, particularly smaller objects such as, for example, screws etc., with an effector of a robot manipulator, sometimes the effector does not (completely) release a respective object despite the release of a respective object in accordance with a control program; instead, the object remains adhered to the effector. The persisting adherence of the object to the effector may occur, for example, due to mechanical adhesion forces, magnetic forces, electrostatic forces, etc.

SUMMARY

The object of the invention is to improve the operational safety and reliability when using the robot manipulator for picking up, handling, and releasing objects.

The invention results from the features of the main claims. Advantageous further embodiments and designs are the subject matter of the dependent claims. Further features, application options, and advantages of the invention result from the following description, and explanation of example embodiments of the invention, which are represented in the figures.

A first aspect of the invention relates to a robot having a robot manipulator with an effector, wherein the robot manipulator is designed and constructed for picking up, handling, and releasing an object. The robot manipulator and the effector are controlled/regulated by a control unit, advantageously in accordance with a control program. To this end, the control unit is designed and constructed to execute the following control program: after the effector releases the object in accordance with a control program, the robot manipulator executes a predefined movement, in which the effector is passed by a wiping object in such a manner that any object possibly still adhering to the effector is wiped off on the surface or the edge of the wiping object.

Thus, with this method, each time the effector is actuated, according to a current step in the control program of the control unit, such that an object being held and/or grasped is released by the effector, a movement is executed to wipe off an object still persistently adhering to the effector despite (mechanical) release by the effector.

The term "release" in this case is understood particularly to be a mechanical release, for example, through the discontinuation/deactivation of retention forces, etc. This means that the effector is actuated such that the previously grasped object is mechanically released. Objects being grasped by the effector may remain adhered to the effector due to adhesion-promoting substances, magnetizing effects, electrostatic forces, etc. despite their mechanical "release." Typically, the objects thereby continue to adhere in their previous holding position on the effector.

Preferably, the predefined movement, in which the effector is passed by the wiping object, is defined such that the object, in its previous position on the effector, is thereby mechanically separated from the effector. The configuration and definition of the movement required for this should be correspondingly selected depending on the application, size, and shape of the objects to be grasped and the size, shape, and positioning of the wiping object.

The previously described embodiment is very reliable, because it executes the described wiping operation independently of an actual persisting adherence of an object already released by the effector. The disadvantage is that the time and also the energy requirements during operation of the robot are thereby increased. Thus, this embodiment is particularly suitable for applications in which an especially high degree of reliability, as relates to the release of objects from the effector, is required.

An alternative second embodiment relates to a robot having a robot manipulator with an effector, wherein the robot manipulator is designed and constructed for picking up, handling, and releasing an object and is controlled/regulated in accordance with a control program by a control unit. The robot includes a first sensor means, which is designed and constructed to determine a persisting adherence of the object to the effector after a "release" of the object in accordance with a control program by the effector and to generate a signal S in the presence of such persisting adherence. To this end, the control unit is further designed and constructed to execute the following control program: where a signal S is present, control the robot manipulator in such a manner that it executes a predefined movement B, in which the effector is passed by a wiping object in such a manner that the adhering object is wiped off on the surface or edge of the wiping object.

Thus, in this embodiment, it is determined by the first sensor means whether, after a "release" in accordance with a control program of the object previously being held/grasped by the effector, the object is also actually mechanically separated/released from the effector and thus is no longer adhering.

An advantageous further embodiment of the robot according to a second alternative is characterized in that the first sensor means has a mechanical contact sensor, or an ultrasound sensor, or an electromagnetic sensor, or an optical sensor, or a force sensor, or a moment sensor, or a combination thereof. The aforementioned sensors are advantageously arranged in/on the robot manipulator, particularly on the effector. Advantageously, the first sensor means further enables a determining of the positioning and/or orientation of the object adhering to the effector. Further advantageously, the first sensor means is designed and constructed to execute the following control program: the signal S is then generated when the first sensor means determines a persisting adherence of the released object by the evaluation of sensor data of the corresponding sensor/sensors.

Especially advantageously, with a robot according to a second alternative, the movement B to be executed is determined depending on a determined position and/or orientation of the object still adhering to the effector. It is thereby possible to optimally adapt the wiping movement depending on the determined position and/or orientation of the object still adhering to the effector such that it can be assured that the persistently adhering object is mechanically separated from the effector in each case by wiping on the wiping object.

An advantageous further embodiment of the robot according to a first or second alternative is characterized in that a second sensor means is available with which collisions of the robot manipulator, particularly of the effector and/or of the robot manipulator in the area of the effector, with objects in the environment (collision objects) or with parts of the robot itself are determined or can be determined. The second sensor means is designed and constructed to execute the following control program: in the event a collision is determined upon a movement of the robot manipulator after a release of an object from the effector in accordance with a control program, a signal S1 is generated. Furthermore, in this further embodiment, the control unit is designed and constructed to execute the following control program: where a signal S1 is present, control the robot manipulator in such a manner that it executes a predefined movement B1, in which the effector is passed by a wiping object in such a manner that the adhering object is wiped off on the surface or edge of the wiping object.

This further embodiment of the robot also covers all cases in which an object released by the effector is not adhering in its original retention position on the effector, but rather in a different position, for example, on the circumferential edge, such that undesirable collisions with objects in the environment (collision objects) may occur upon a movement of the effector based on the object adhering thereto and thus the object enlarging the effective outline of the effector. In particular, thus all cases in which the first sensor means cannot determine any adherence of an object to the effector are also covered.

In an advantageous further embodiment, signal S is identical to signal S1. In an alternative further embodiment, signal S is not identical to signal S1. In an advantageous further embodiment, movement B is identical to movement B1. In an alternative further embodiment, movement B is not identical to movement B1.

An advantageous further embodiment of the robot according to a second alternative is characterized in that the determination of a collision of the robot manipulator, particularly in the area of the effector, with objects in the environment (collision objects) takes place by the second sensor means based on measurement data of one or more sensors and/or based on at least one algorithm applied to the measurement data.

Advantageously, the sensor or sensors of the second sensor means are selected from the following list: electrical voltage sensor, electrical current sensor, acceleration sensor, moment sensor, force sensor, strain sensor.

An advantageous further embodiment of the robot according to a first or second alternative is characterized in that the wiping object has an edge, and the control unit is designed and constructed to execute the following control program: control of the robot manipulator such that the effector wipes off the adhering object on the edge.

Advantageously, the first sensor means detects a position and/or orientation of the object on the effector. In this case, the movement B is defined depending on the respectively determined position and/or orientation of the object on the effector such that the object is wiped off on the wiping object by the movement. Advantageously, corresponding movements B are determined and predefined for various positions and/or orientations of an object adhering to the effector.

The wiping object is advantageously a funnel, wherein the control unit is designed and constructed to execute the following control program: control of the robot manipulator such that the effector wipes off the adhering object on the edge of the funnel such that it falls into the funnel.

An advantageous further embodiment of the robot according to a first or second alternative is characterized in that the wiping object is a type of textile, and the control unit is designed and constructed to control the robot manipulator such that the effector wipes off the adhering object on the surface of the textile such that it falls onto the textile.

An advantageous further embodiment of the robot according to a first or second alternative is characterized in that the robot manipulator is force-controlled and/or impedance-controlled and/or admittance-controlled, and the control unit is designed and constructed to execute the following control program: if forces/moments acting on the robot arm externally and/or variables derived therefrom exceed predefined limits during the wipe-off on the wiping object, control of the robot manipulator such that it assumes a predefined state and/or is precisely removed from the location of the fault. The "predefined state" is advantageously a standby pose, i.e., the robot manipulator moves to the standby pose and pauses there.

An advantageous further embodiment of the robot is characterized in that the robot has a data interface to a data network (e.g., Internet, local area network), and the robot is designed and constructed to load control programs for the control unit from the data network. Advantageously, the robot has a data interface as well as a corresponding program memory for this. Advantageously, the control programs are made available in the respective data network by a central provider. The data network is advantageously a wired data network, a wireless data network, or a combination thereof.

Advantageously, the robot is designed and constructed to load control and regulation parameters to the control programs from the data network. The control and regulation parameters define the specific application of the corresponding control program. The control and regulation parameters are particularly adapted to the task to be achieved. Advantageously, the robot has a corresponding data memory for this.

Advantageously, the robot is designed and constructed to load control and regulation parameters to the control programs for the control unit via a manual input interface of the robot (for example, a human-machine interface available in the area of the robot) and/or via a teach-in process, in which the robot manipulator is guided manually, i.e., is moved by a user through the application of a force. Furthermore, both the manual input interface and a teach-in process carried out with the robot manipulator enable a correction and/or adaptation of control and regulation parameters loaded from the data network.

Advantageously, the robot is designed and constructed such that the loading of control programs and/or of corresponding control and regulation parameters from the data network is controlled by a remote station, which is likewise connected to the data network. Such remote stations may be, for example, tablets, smart phones, notebooks, personal computers, etc.

Advantageously, a remote station is operated by a central provider.

Advantageously, the robot is designed and constructed to send control programs and/or corresponding control and regulation parameters locally available in the robot to other users in the data network upon a request from a user in the data network and/or autonomously, for example, when a predefined condition is present. Such a "user" may be essentially any computing and/or memory unit configured for this data exchange.

Advantageously, the robot is designed and constructed to start control programs loaded locally on/in the robot with the corresponding control and regulation parameters from a remote station, which is likewise connected to the data network. Such remote stations may be, for example, tablets, smart phones, notebooks, personal computers, etc. Advantageously, a remote station is operated by a central provider.

Advantageously, the remote station and/or the manual input interface on the robot has a human-machine interface, which is designed and constructed for the input of control programs and/or corresponding control and regulation parameters, and/or for the selection of control programs and/or corresponding control and regulation parameters from a plurality of available control programs and/or corresponding control and regulation parameters.

Advantageously, the human-machine interface enables inputs via a drag-and-drop input on a touchscreen, a guided input dialogue, a keyboard, a computer mouse, a haptic input interface, virtual-reality glasses, an acoustic input interface, body tracking, on the basis of electromyography data, on the basis of electroencephalography, via a neuronal interface to the brain of the operator, or combinations thereof.

Advantageously, the human-machine interface is designed and constructed for outputting audiovisual, haptic, olfactory, tactile, or electrical feedback, or a combination thereof.

A further aspect of the invention relates to a method, according to a first alternative for operating a robot, which has a robot manipulator with an effector, wherein the robot manipulator is designed and constructed for picking up, handling, and releasing an object and is controlled/regulated in accordance with a control program by a control unit. According to the invention, the control unit executes a control program with the following steps: Control of the robot manipulator after the effector releases an object in accordance with a control program such that a predefined movement is executed, in which the effector with the object possibly still adhering to the effector is passed by a wiping object in such a manner that the adhering object is wiped off on the surface or the edge of the wiping object.

A further aspect of the invention relates to a method according to a second alternative for operating a robot, which has a robot manipulator with an effector, wherein the robot manipulator is designed and constructed for picking up, handling, and releasing an object and is controlled/regulated in accordance with a control program by a control unit. The robot manipulator in this case includes a first sensor means, by which persistent adherence of the object to the effector is determined after a release of the object in accordance with a control program by the effector. In the presence of such persisting adherence, the first sensor means generates a signal S. The control unit is designed and constructed such that where a signal S is present, the robot manipulator is controlled such that it executes a predefined movement B, in which the effector with the persistently adhering object is passed by a wiping object in such a manner that the adhering object is wiped off on the surface or the edge of the wiping object.

An advantageous further embodiment of the method according to a second alternative is characterized in that the first sensor means has a mechanical contact sensor, or an ultrasound sensor, or an electromagnetic sensor, or an optical sensor, or a force sensor, or a moment sensor, or a combination thereof, wherein the sensor/sensors is/are arranged in/on the robot manipulator, particularly on the effector, and wherein the sensor means is designed and constructed to execute the following control program: Generation of the signal S when the first sensor means determines a persisting adherence of the released object by evaluating the sensor data of the corresponding sensors.

An advantageous further embodiment of the method according to a second alternative is characterized in that a second sensor means is present, with which collisions of the robot manipulator with objects in the environment (collision objects) are determined, wherein the second sensor means is designed and constructed to execute the following control program: in the event a collision is determined upon a movement B1 of the robot manipulator after a release of an object by the effector in accordance with a control program, a signal S1 is generated.

An advantageous further embodiment of the method according to a second alternative is characterized in that the determination of a collision of the robot manipulator, particularly a collision in the area of the effector, with objects in the environment (collision objects) or with the robot itself takes place by the second sensor means based on measurement data of one or more sensors and/or based on at least one algorithm applied to the measurement data. The one or more sensors are advantageously integrated into the robot manipulator and provide corresponding measurement data.

An advantageous further embodiment of the method according to a first or second alternative is characterized in that the wiping object has an edge, and the control unit is designed and constructed to execute the following control program: control of the robot manipulator such that the effector wipes off the adhering object on the edge of the wiping object.

An advantageous further embodiment of the method according to a first or second alternative is characterized in that the wiping object is a funnel, and the control unit executes the following control program: control of the robot manipulator such that the effector wipes off the adhering object on the edge of the funnel such that it falls into the funnel.

An advantageous further embodiment of the method according to a first or second alternative is characterized in that the wiping object is a type of textile, and the control unit executes the following control program: control of the robot manipulator such that the effector wipes off the adhering object on a surface of the textile.

An advantageous further embodiment of the method according to a first or second alternative is characterized in that the robot manipulator is force-controlled and/or impedance-controlled and/or admittance-controlled, wherein the control unit executes the following control program: if forces/moments acting on the robot arm externally during wipe-off exceed predefined limits, the robot manipulator is controlled such that it assumes a predefined state.

An advantageous further embodiment of the method according to a first or second alternative is characterized in that the robot has a data interface to a data network, and the device is designed and constructed to load one or more control programs from the data network.

An advantageous further embodiment of the method according to a first or second alternative is characterized in that the robot has a data interface to a data network, and the robot is designed and constructed to load one or more control programs from the data network.

An advantageous further embodiment of the method according to a first or second alternative is characterized in that the robot loads control and regulation parameters to the control programs from the data network.

An advantageous further embodiment of the method according to a first or second alternative is characterized in that the robot loads control and regulation parameters to the control programs available locally on the robot via a local input interface and/or via a teach-in process, in which the robot manipulator is guided manually.

An advantageous further embodiment of the method according to a first or second alternative is characterized in that the loading of control programs and/or of corresponding control and regulation parameters from the data network to the robot is controlled by a remote station, which is likewise connected to the data network.

An advantageous further embodiment of the method according to a first or second alternative is characterized in that a control program with the corresponding control and regulation parameters is controlled by a remote station, which is likewise connected to the data network.

Advantages and advantageous further embodiments of the method as well as explanations regarding same result from an analogous and corresponding transfer of the statements previously made regarding the robot according to the invention.

A further aspect of the invention relates to a computer system with a data processing device, wherein the data processing device is designed such that a previously described method is executed on the data processing device.

A further aspect of the invention relates to a digital storage medium with electronically readable control signals, wherein the control signals can interact with a programmable computer system such that a previously described method is executed.

A further aspect of the invention relates to a computer program product with a memory code, stored on a machine-readable carrier, for executing the previously described method when the program code is implemented on a data processing device.

A further aspect of the invention relates to a computer program with memory codes for executing the previously described method when the program is running on a data processing device. To this end, the data processing device may be designed as any computer system known from the prior art.

Other advantages, features, and details result from the following description, in which at least one example embodiment is described in detail—optionally with reference to the drawings. Equivalent, similar, and/or functionally equivalent parts have been given the same reference numerals.

DETAILED DESCRIPTION

Figure 1:
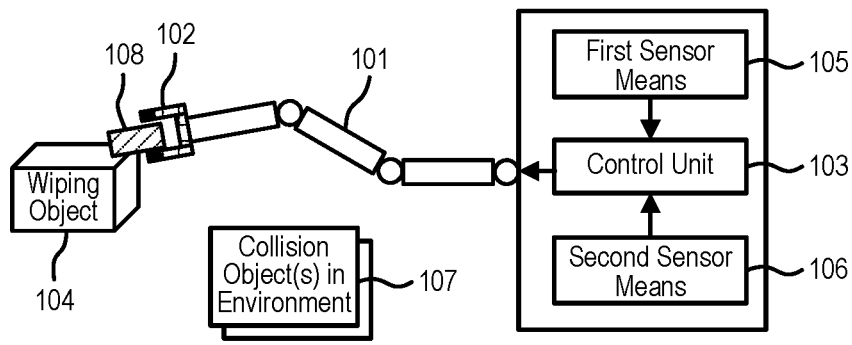
FIG. 1 shows a highly schematic construction of the proposed robot.

FIG. 1 shows a highly schematic construction of the proposed robot 100, having a robot manipulator 101 with an effector 102, wherein the robot manipulator 101 is designed and constructed to pick up, handle, and release an object 108 and is controlled/regulated in accordance with a control program by a control unit 103, including a first sensor means 105, which is designed and constructed to determine whether there is a persisting adherence of the object 108 to the effector after release of the object from the effector 102 in accordance with the control program, and in an event that the adherence is determined, to generate a signal S, wherein the control unit 103 is designed and constructed to execute the following control program: where a signal S is present, control/regulate the robot manipulator 101 based on the signal S in such a manner that it executes a predefined movement in which the effector 102 is passed by a wiping object 104 in such a manner that the object 108 still adhering to the effector 102 is wiped off the effector 102 on the surface or the edge of the wiping object 104. The sensor means 105 includes one or more sensors, which in this case can be a mechanical contact sensor, an ultrasound sensor, and/or an optical sensor, wherein the one or more sensors are arranged in/on the robot manipulator 101. In doing so, the first sensor means 105 is designed and constructed to generate a signal S when the first sensor means 105 determines persisting adherence of the released object 108 through evaluation of corresponding sensor data of the one or more sensors.

Furthermore, the robot 100 includes a second sensor means 106, with which it can be determined whether there are collisions of the robot manipulator 101 with one or more objects in the environment (collision objects) 107, wherein the second sensor means 106 is designed and constructed to execute the following control program: in the event a collision of the robot manipulator 101 with a collision object 107 is determined upon a movement of the robot manipulator 101 after release of the object 108 from the effector 102 in accordance with a control program and before pickup of a next object by the effector 102, a signal S1 is generated. Furthermore, the control unit 103 is designed and constructed to execute the following control program: where a signal S1 is present, control the robot manipulator 101 based on signal S1 in such a manner that the robot manipulator 101 executes a predefined movement B1, in which the effector 102 is passed by the wiping object 104 in such a manner that the object 108 still adhering to the effector 102 is wiped off the effector 102 on the surface or the edge of the wiping object 104.

Figure 2:
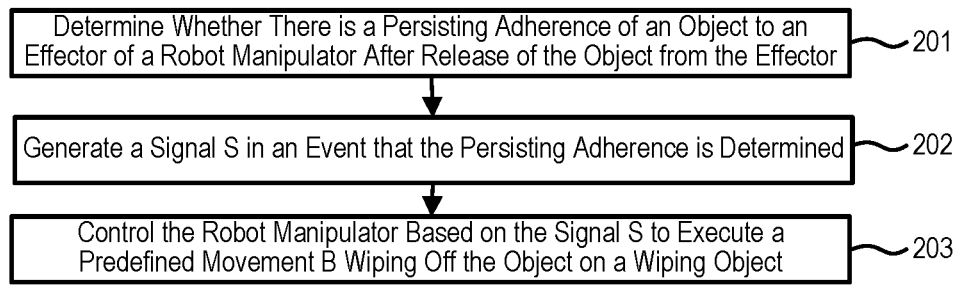
FIG. 2 shows a highly schematic flowchart according to an embodiment of the proposed method.

FIG. 2 shows a highly schematic flowchart according to an embodiment of a proposed method 200 for controlling a robot 100, which has a robot manipulator 101 with an effector 102, wherein the robot manipulator 101 is designed and constructed to pick up, handle, and release an object 108 and is controlled/regulated in accordance with a control program by a control unit 103. The method 200 includes the following steps: In step 201, a determination is made, e.g., via a first sensor means 105, as to whether there is a persisting adherence of the object 108 to the effector 102 after release of the object 108 from the effector 102. In a step 202, there is generated a signal S, e.g., via the first sensor means 105, in the event that the persisting adherence of the object 108 to the effector 102 is determined in step 201. In step 203, where the signal S is present, the robot manipulator 101 is controlled/regulated, e.g., via the control unit 103, based on the signal S1 such that it executes at least one predefined movement, in which the effector 102 is passed by a wiping object 104 in such a manner that the object 108 still adhering to the effector 102 is wiped off the effector 102 on the surface or the edge of the wiping object 104.

Figure 3:
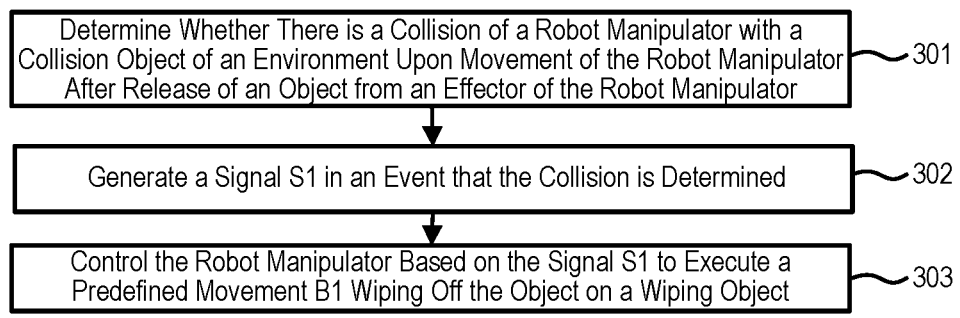
FIG. 3 shows a highly schematic flowchart according to a further embodiment of the proposed method.

FIG. 3 shows a highly schematic flowchart according to a further embodiment of a proposed method 300 for controlling a robot 100, which has a robot manipulator 101 with an effector 102, wherein the robot manipulator 101 is designed and constructed to pick up, handle, and release an object 108 and is controlled/regulated in accordance with a control program by a control unit 103. The method 300 includes the following steps: In step 301, a determination is made, e.g., via a second sensor means 106, as to whether there is a collision of the robot manipulator 101 with an object in the environment (collision object) 107 upon movement of the robot manipulator 101 after release of the object 108 from the effector 102. In step 302, there is generated a signal S1, e.g., via the second sensor means 106, in the event that the collision of the robot manipulator 101 with the collision object 107 is determined in step 301. In step 303, where the signal S1 is present, the robot manipulator 101 is controlled/regulated, e.g., via the control unit 103, based on the signal S1 such that it executes at least one predefined movement B1, in which the effector 102 is passed by the wiping object 104 in such a manner that the object 108 still adhering to the effector 102 is wiped off the effector 102 on the surface or the edge of the wiping object 104.

Although the invention has been illustrated and explained in more detail by using preferred example embodiments, the invention is not limited by the disclosed examples and other variations may be derived by one of ordinary skill in the art without extending beyond the protective scope of the invention. It is thus clear that a plurality of variation options exist. It is likewise clear that example embodiments actually only represent examples, which are not to be interpreted in any manner as a limitation, for example, of the protective scope, the use options, or the configuration of the invention. Rather, the previous description and the description of figures should make one of ordinary skill in the art capable of specifically implementing the example embodiments, wherein one of ordinary skill in the art with knowledge of the disclosed concept of the invention can undertake various changes, for example with respect to the function or the arrangement of individual elements listed in an example embodiment, without going beyond the scope of protection, which is defined by the claims and the legal equivalents thereof such as, for example, more extensive explanations in the description.

LIST OF REFERENCE NUMERALS

101 Robot manipulator
103 Control unit
104 Wiping object
105 First sensor means
106 Second sensor means
201-203 Method steps of an embodiment
301-303 Method steps of a further embodiment

The invention claimed is:

1. A robot comprising:
a robot manipulator including an effector, the robot manipulator configured to pick up, handle, and release an object using the effector;
a first sensor means for determining whether there is a persisting adherence of the object to the effector after the object is released by the effector, and for generating a signal S in an event that the persisting adherence is determined; and
a control unit configured to control the robot manipulator, wherein the control unit executes a control program configured to perform operations that comprise causing the robot manipulator to execute a predefined movement B based on the signal S, wherein the predefined movement B passes the effector by a wiping object in such a manner that the object still adhering to the effector after the release is wiped off the effector on a surface or an edge of the wiping object.

2. The robot according to claim 1, further comprising:
a second sensor means for determining whether there is a collision of the robot manipulator with a collision object upon movement of the robot manipulator after the object is released by the effector, and for generating a signal S1 in an event that the collision is determined; and
wherein the control program executed by the control unit is configured to perform operations that further comprise causing the robot manipulator to execute a predefined movement B1 based on the signal S1, wherein the predefined movement B1 passes the effector by the wiping object in such a manner that the object still adhering to the effector after the release is wiped off the effector on the surface or the edge of the wiping object.

3. The robot according to claim 1, wherein the robot manipulator is force-controlled and/or impedance-controlled and/or admittance-controlled, and wherein the control program executed by the control unit is configured to perform operations that further comprise controlling the robot manipulator such that the robot manipulator assumes a predefined state when forces or moments acting on the robot manipulator externally during wipe-off on the surface or the edge of the wiping object exceed predefined limits.

4. The robot according to claim 1, wherein the robot has a data interface to a data network, and the robot is designed and constructed to load the control program for the control unit from the data network.

5. The robot according to claim 4, wherein the robot is designed and constructed to load one or more control and regulation parameters corresponding to the control program from the data network.

6. The robot according to claim 5, wherein the robot is designed and constructed such that loading of the control program and/or corresponding one or more control and regulation parameters from the data network is controlled by a remote station connected to the data network.

7. The robot according to claim 6, wherein the remote station and/or a manual input interface has a human-machine interface, the human-machine interface designed and constructed for input of the control program and/or corresponding one or more control and regulation parameters, and/or for selection of the control program and/or one or more corresponding control and regulation parameters from a plurality of available control programs and/or a plurality of corresponding control and regulation parameters.

8. A method of operating a robot manipulator including an effector, the robot manipulator configured to pick up, handle, and release an object using the effector, the method comprising:
determining, using a first sensor means, whether there is a persisting adherence of the object to the effector after the object is released by the effector;
generating, using the first sensor means, a signal S in an event that the persisting adherence is determined; and
controlling the robot manipulator, using a control unit, such as to cause the robot manipulator to execute a predefined movement B based on the signal S, wherein the predefined movement B passes the effector by a wiping object in such a manner that the object still adhering to the effector after the release is wiped off the effector on a surface of an edge of the wiping object.

9. The method according to claim 8, further comprising:
determining, using a second sensor means, whether there is collision of the robot manipulator with a collision object upon movement of the robot manipulator after the object is released by the effector;
generating, using the second sensor means, a signal S1 in an event that the collision is determined; and
controlling the robot manipulator, using the control unit, in such a manner that causes the robot manipulator to execute a predefined movement B1 based on the signal S1, wherein the predefined movement B1 passes the effector by the wiping object in such a manner that the object still adhering to the effector after the release is wiped off the effector on the surface or the edge of the wiping object.

10. The method according to claim 8, further comprising:
controlling the robot manipulator, using the control unit, in force-controlled and/or impedance-controlled and/or admittance-controlled manner; and
controlling the robot manipulator, using the control unit, such that the robot manipulator assumes a predefined state when forces or moments acting on the robot manipulator externally during wipe-off on the surface or the edge of the wiping object exceed predefined limits.

11. The method according to claim 8, wherein the robot includes a data interface to a data network, the method further comprising loading the control program for the control unit from the data network.

12. The method according to claim 11, further comprising loading one or more control and regulation parameters corresponding to the control program from the data network.

13. The method according to claim 12, further comprising controlling, using a remote station connected to the data network, the loading of the control program and/or the control and regulation parameters corresponding to the control program from the data network.

14. The method according to claim 13, further comprising:
providing the remote station and/or a manual input interface with a human-machine interface; and
inputting, using the human-machine interface, the control program and/or the control and regulation parameters corresponding to the control program, and/or selecting, using the human-machine interface, the control program and/or the control and regulation parameters corresponding to the control program from a plurality of available control programs and/or a plurality of corresponding control and regulation parameters.

* * * * *